(12) United States Patent
LeSourd

(10) Patent No.: US 8,974,280 B2
(45) Date of Patent: Mar. 10, 2015

(54) CLOCKWORK WHEEL MECHANISM WITH LCD BACKGROUND

(75) Inventor: Kehl LeSourd, Reno, NV (US)

(73) Assignee: IGT, Las Vegas, NV (US)

( * ) Notice: Subject to any disclaimer, the term of this patent is extended or adjusted under 35 U.S.C. 154(b) by 205 days.

(21) Appl. No.: 13/402,493

(22) Filed: Feb. 22, 2012

(65) Prior Publication Data

US 2013/0217458 A1    Aug. 22, 2013

(51) Int. Cl.
*A63F 13/00* (2014.01)
*G07F 17/32* (2006.01)
*G07F 17/34* (2006.01)

(52) U.S. Cl.
CPC ............ *G07F 17/3213* (2013.01); *G07F 17/34* (2013.01)
USPC .................... 463/16; 463/18; 463/20; 463/30

(58) Field of Classification Search
USPC .......................................... 463/16, 18, 20, 30
See application file for complete search history.

(56) References Cited

U.S. PATENT DOCUMENTS

| 3,376,039 | A | * | 4/1968 | Fenton ............................ 463/52 |
| 4,372,687 | A | * | 2/1983 | Krasovsky et al. ............. 368/28 |
| 5,018,737 | A | * | 5/1991 | Okada ........................ 273/143 R |
| 5,987,847 | A | * | 11/1999 | Nordstrom et al. ............. 53/234 |
| 2004/0183251 | A1 | * | 9/2004 | Inoue ........................ 273/143 R |
| 2009/0312095 | A1 | * | 12/2009 | Durham et al. ................. 463/30 |
| 2011/0263309 | A1 | * | 10/2011 | Gowin ............................ 463/16 |

* cited by examiner

*Primary Examiner* — Dmitry Suhol
*Assistant Examiner* — Brandon Gray
(74) *Attorney, Agent, or Firm* — Neal, Gerber & Eisenberg LLP

(57) ABSTRACT

A gaming display apparatus includes a primary rotating device and a secondary rotating device. The gaming display apparatus also includes a rotary drive mechanism attached to the primary rotating device. A Geneva wheel mechanism is attached to the secondary rotating device. The rotary drive mechanism includes a pin for engaging the Geneva wheel mechanism. The pin and the Geneva wheel mechanism drive the secondary rotating device. A method for display of a game includes driving a primary rotating device with a drive mechanism, attaching at least one Geneva wheel to a secondary rotating device, and driving the secondary rotating device using a pin on the drive mechanism.

23 Claims, 8 Drawing Sheets

CLOCKWORK WHEEL MECHANISM WITH LCD BACKGROUND

TECHNICAL FIELD

Various embodiments described herein relate to a display for a gaming machine. More specifically, the display includes a first spinning portion and a second spinning portion which spin at different angular velocities. The ring can be backed by an liquid crystal display (LCD) and the motion caused by a clockwork mechanism, or Geneva wheel.

BACKGROUND

Gaming devices, such as slot machines and video poker machines, provide fun and excitement to the player. Gaming, in general, provides an escape from the everyday rigors of life. Gaming devices use bright lights and exciting sounds to have the gaming machines stand out from other gaming machines. Gaming devices, in particular, use one or more displays that enable the player to see and play the game. The displays typically portray the action of the game and ultimately indicate whether or not the player wins and how much the player wins.

The quest for gaming instrumentalities which will provide greater game interest and entertainment among players who wager is an ongoing odyssey. Greater game interest translates into greater revenues for the owners of the games. More interest translates into more money wagered on a machine over time. A popular game will stay on a gaming floor for a longer amount of time since the game owner, such as a casino, will get more revenue from a popular game. Even popular games can have a drop off in popularity over time. New games or improved games generally enjoy a time of increased popularity. Therefore, the industry always seems to seek different ways of making even popular games have some level of newness. This piques players interest in the game so that it will draw high number of players while it has the new feature. If a new feature is introduced periodically, the overall numbers of players can be increased over a given time period. Increased numbers translates into increased revenue to the owner of the particular game. Different features or different displays or different aspects of game play can be introduced periodically to keep even popular games fresh and new and keep the players interested in coming to play a particular game.

In the recent past, most new games are based on video displays. The advent of the computer and the video monitor expanded the possibilities for gaming devices. There are now video poker, video blackjack and other types of video gaming machines. Video displays are popular and very versatile as any number of games can be offered by merely rendering the game on the video display. There is one phenomenon that is contrary to continually introducing brand new features on a video game. There is a nostalgic movement that provides appeal for some game players. Therefore, sometimes changing a game to include an old aspect or nostalgic feature also appeals to players and can be another way to introduce a change that attracts players to a game. One prime example is video slot machines. Reels were used in early "one-armed bandits". To appeal to certain players, sometimes reels are rendered on video displays that replicate the reels. Some new video slot machines even include actual "old-time" reels and a handle to pull to cause the reels to move.

In addition to introducing new features or new game play to keep a game fresh, there are also other ways to maintain interest in a game. For example, bonus games attract and keep players at a gaming machine. As a result, bonus games in gaming machines have become much more prevalent and elaborate in recent years. The bonus game is typically a gaming machine or a random selection device having a gaming play that is enabled by a bonus qualifying signal from an underlying or primary gaming machine. Bonus games include an additional game feature contained within a single gaming machine. For example, in slot machines, video monitors have also been used to provide bonus or secondary games. Players play the base game of slot until becoming eligible for a bonus game. The base game temporarily pauses, while the player plays the bonus game. When the player completes the bonus game, the gaming device returns the player to the base game.

Accordingly, providing a gaming device that may use a video monitor, which provides increased flexibility to the gaming device to add more symbols and more elaborate bonus games, while providing some aspect of the gaming device that is mechanical and provides a fun and exciting mechanical display is desirable.

SUMMARY OF THE DESCRIBED EMBODIMENTS

A gaming display apparatus includes a primary rotating device and a secondary rotating device. The gaming display apparatus also includes a rotary drive mechanism attached to the primary rotating device. A Geneva wheel mechanism is attached to the secondary rotating device. The rotary drive mechanism includes a pin for engaging the Geneva wheel mechanism. The pin and the Geneva wheel mechanism drive the secondary rotating device. The secondary rotating device includes a transparent portion. A secondary display is positioned behind the primary and secondary rotating portions and is viewable through the transparent portion. In one embodiment, the secondary display is at least one liquid crystal display positioned to be viewed through at least a portion of the secondary rotating device. In one embodiment, the secondary rotating device includes a plurality of Geneva wheels attached to the secondary rotating device. The pin of the rotary drive mechanism drives the plurality of Geneva wheels attached to the secondary rotating device. The primary rotating device includes an inner wheel and an outer wheel. In an embodiment, the inner wheel and the outer wheel are separated. The inner wheel and the outer wheel can also be attached to one another so that the inner wheel and the outer wheel rotate at substantially the same angular velocity. The secondary rotating portion, in some embodiments, is a ring positioned between the inner wheel and the outer wheel of the primary rotating device. The gaming display can also include a chase light positioned around the primary rotating device. The rotary drive mechanism includes a stepper motor.

A method for display of a game includes driving a primary rotating device with a drive mechanism, attaching at least one Geneva wheel to a secondary rotating device, and driving the secondary rotating device using a pin on the drive mechanism. The pin on the drive mechanism is positioned to engage the at least one Geneva wheel on the secondary rotating device. In some embodiments, a plurality of Geneva wheels are attached to the secondary rotating device. The plurality of Geneva wheels are driven with the pin on the drive mechanism. The secondary rotating device includes at least one window. A secondary display is placed in a position for viewing through the window of the secondary rotating device. Driving the primary rotating device includes rotating the primary rotating device at a first angular velocity and driving the secondary rotating device includes rotating the secondary device at an angular velocity which differs from the first angular velocity during portions of the rotation.

A method for displaying a game includes driving a primary rotating device with a drive mechanism, and driving a secondary rotating with the drive mechanism, the primary rotating device driven at a first rate and the secondary rotating device rotating at a rate different from the first rate during at least a portion of the rotation. The secondary rotating device includes at least one window. The primary rotating device includes an inner wheel and an outer wheel. The secondary rotating device includes a ring positioned between the inner wheel and the outer wheel. In some embodiments, the secondary rotating portion and the first rotating portion are rotated by a single drive wheel or drive mechanism. In another embodiment, the first or primary rotating portion is driven by a first driver and a second rotating portion is driven by a second driver or drive mechanism. The first driver and the second driver can be under software control so as to produce a motion where the angular velocity of the secondary rotating portion varies with respect to the angular velocity of the primary rotating portion.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
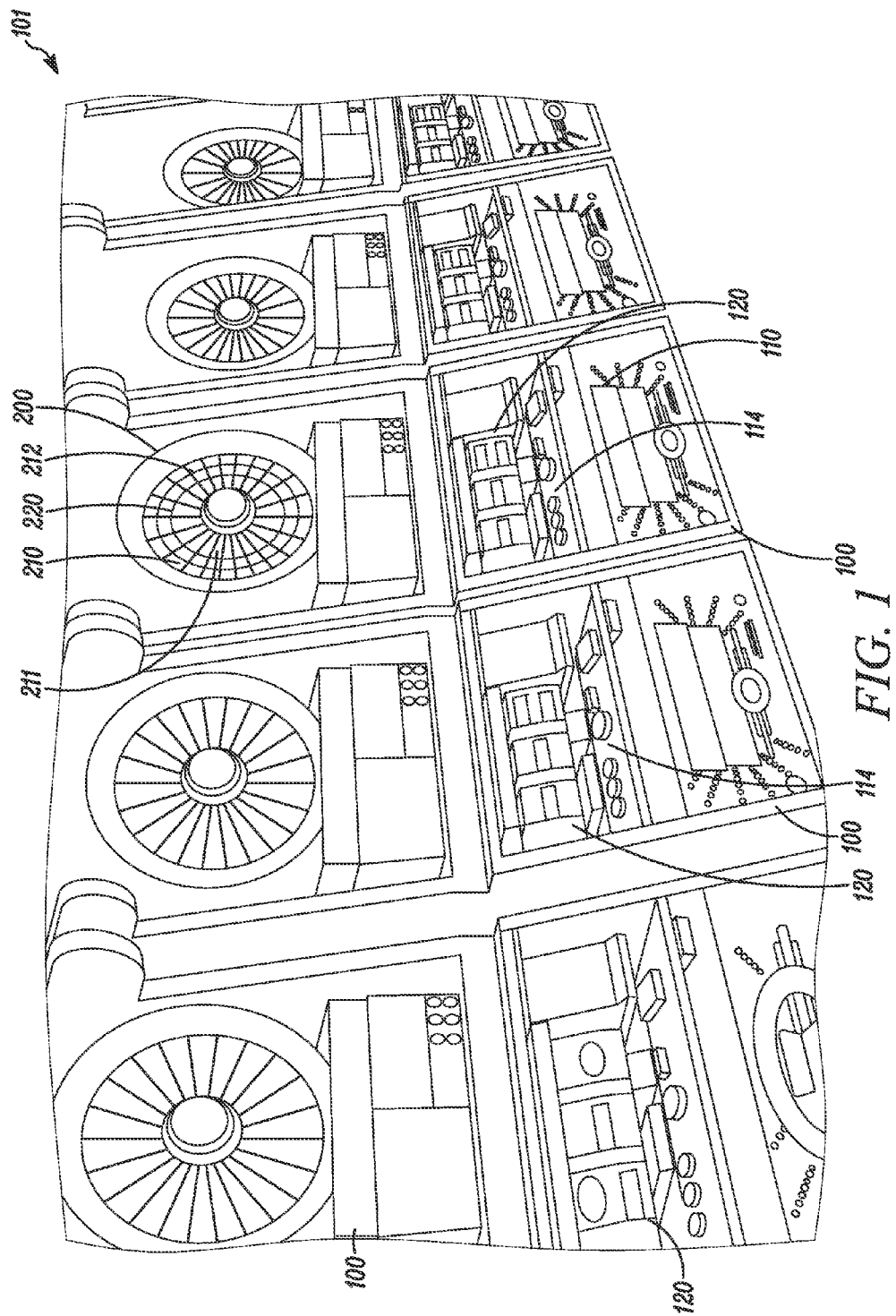
FIG. 1 is a perspective view of a bank of slot machines at least one of which includes an example embodiment of the invention.

FIG. 1 is a perspective view of a bank 101 of slot machines on a casino floor, at least one of which includes an example embodiment of the invention. As shown in FIG. 1, the bank of slot machines includes a plurality of electronic gaming machines 100. Generally, an electronic gaming machine 100 encloses the computer system 2604 (gaming device shown in FIG. 9) and additional components which may or may not be coupled to the computer and under computer control, according to an example embodiment. The individual gaming devices can be attached to a network 2601. Also attached to the network 2601 is a server 2602. The server 2602, the gaming device 2604 and other devices attached to the network 2601 form a gaming system 2600. Such gaming systems can be found on many gaming floors in casinos and elsewhere. The gaming system 2600 can include a number of gaming machines in a progressive game with progressive jackpots.

The gaming machine 100 includes a housing 110 which has a top box 112 and a cabinet enclosure 190. The housing 110 also includes a specialized keyboard 114, which is also termed a player switch panel which is accessible to the player. The player makes wagers and controls certain aspects of play through the player switch panel 114. The housing 110 includes a first display 120 and a second display 200. The first display 120 is for the primary game of the electronic gaming machine 100. The first display or monitor 120 displays many of the main aspects of the game as the game is played. In the embodiment shown, the first display or monitor 120 includes a number of reels associated with a slot machine. The reels can be actual reels or can be graphical renderings of reels. The player switch panel 114 includes buttons for interaction by the user with the electronic gaming machine 100. The buttons can be used to set a bet and also determine a number of lines to bet as well as a wager amount. As shown in FIG. 1, the electronic gaming machines include a wheel of fortune theme. It should be noted that the wheel of fortune type machine is only one type of machine that can use the invention. The user interacts mainly with the first monitor 120 during game play.

The second monitor 200 can also display some of the aspects of the game as played. In some embodiments, the second monitor or display 200 is used for displaying or playing a bonus game. A bonus game is another game related to the first game. The bonus game can be thought of as a game within a game. Both monitors 120, 200 display graphics for attracting players while the game is not being played. The display 200 includes a first rotating portion 210 and a second rotating portion 220. The first rotating portion 210 includes a first or inner rotating wheel 211 and the second or outer rotating wheel 212. The inner rotating wheel 211 and the outer rotating wheel 212 are attached to one another and rotate at substantially the same angular velocity. The second rotating portion 220 is a ring which is positioned between the first rotating wheel 211 and the second rotating wheel to 212. As shown in FIG. 1, the bank 101 of electronic gaming machines 100 includes only a single machine includes the second display 200.

Many computer components are within housing 110 such as a central processor on a mother board, a communication board assembly, an input/output board, a power supply, and a DC communication board assembly, and a DC distribution board assembly. Some of these components are for a typical computer system, such as the one described below in FIG. 9. The housing 110 also includes other components that are not part of the computer system 900 (shown in FIG. 9) but are part of the EGM 100 or the gaming system 2600.

Figure 2:
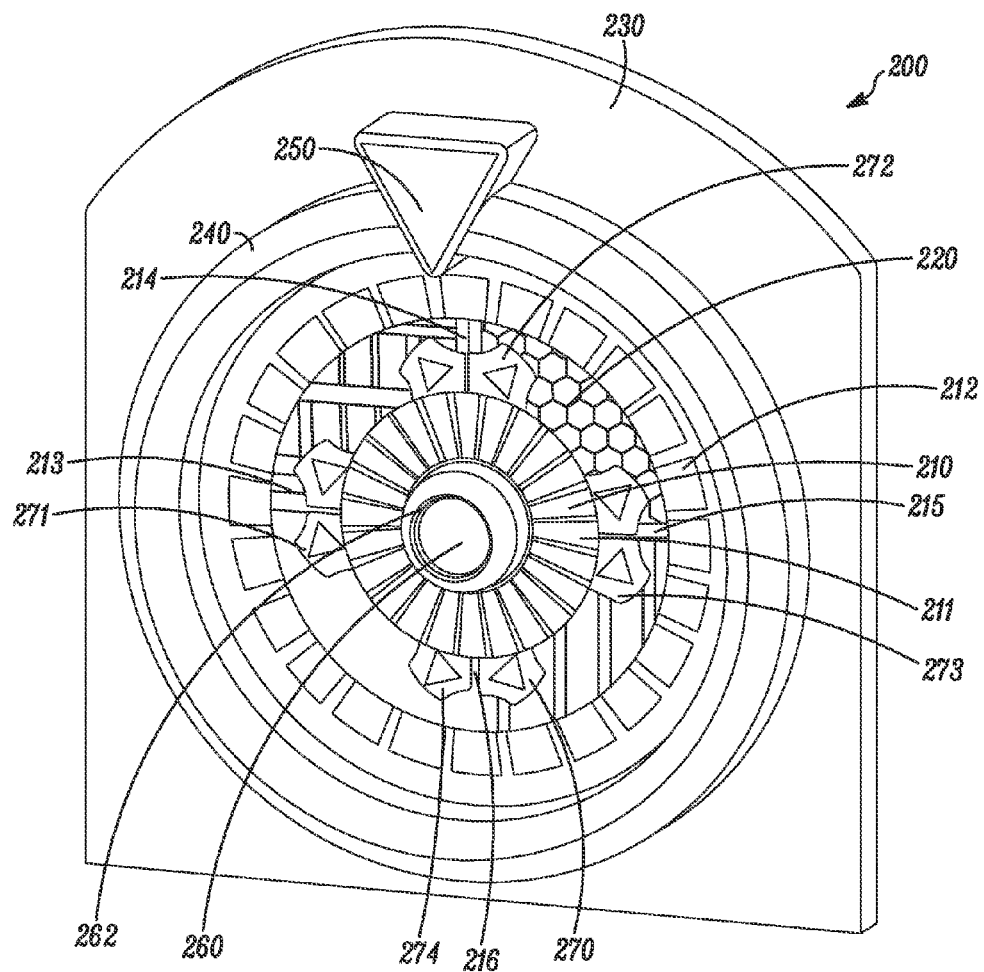
FIG. 2 shows a perspective view of a display from an electronic gaming machine, according to an example embodiment.

FIG. 2 shows a perspective view of the display 200 from an electronic gaming machine 100, according to an example embodiment. FIG. 2 shows the display 200 which will now be further detailed. The display 200 includes a glass or plexiglass background 230. The background 230 includes graphics and is back lighted. The graphics shown in FIG. 2 are for a wheel of fortune display 200. It should be noted that the invention is not related to a particular theme or to a particular game but can be used with any particular game or theme. The display 200 also includes a chase ring 240. The chase ring 240 includes lights which are sequentially lit as the primary rotating portion 210 rotates. The lights within the chase ring 240 appear to be chasing the rotation of the first rotating portion 210. The display 200 also includes a pointer indicator 250. The pointer indicator 250 is backlit, and this example embodiment. The display also includes the first rotating portion 210 and the second rotating portion 220. The first rotating portion 210 includes an inner wheel 211 and an outer wheel 212 which are connected to one another. Thus the inner wheel 211 and the outer wheel 212 rotate at the same or substantially the same angular velocity. A set of webs connect the inner wheel 211 the outer wheel 212. As shown in FIG. 2, webs 213, 214, 215, and 216 connect the inner wheel 211 and the outer wheel 212. The inner wheel 211 and the outer wheel 212 and the webs 213, 214, 215, and 216 form the first rotating portion 210. The second rotational or rotating portion 220 rotates at a different angular velocity from the first rotating portion 210. The second rotating portion 220 is transparent. One or more displays can be placed behind the second rotating portion 220. The one or more displays can be seen through the second rotating portion 220. As shown in FIG. 2, therefore LCD or liquid crystal displays positioned behind the second rotating portion 220. Two of the LCDs show a set of reels associated with a slot machine. Another LCD shows a set of numbers. And yet another LCD shows a pattern that also includes numbers. In one embodiment, four separate LCDs are positioned behind the second rotating portion 220. In another embodiment a single LCD is placed behind the second rotating portion and is divided into separate display areas. Four display areas are shown in FIG. 2. It should be noted that any number of display areas can be placed behind the transparent second rotating portion 220.

The primary rotating portion 210 is connected to a hub 260. The primary rotating portion 210 rotates about the hub 260. The hub 260 includes a hub cap 262. The second rotating portion 220 also includes a set 270 of four driven indicators or fans 271, 272, 273, 274. The four driven indicators are fans 271, 272, 273, 274, can also be used to show different aspects of a game associated with the electronic gaming machine 100. In one example embodiment, the second rotating portion 220 and the LCD display are displays located behind the second rotating portion 220 are used to display a certain aspects of a bonus game. Should be noted however, that certain aspects of the bonus game can be displayed or it can be part of the primary game in still be encompassed as part of the invention.

The primary rotating portion 210 is in this really accelerated to a substantially angular velocity and then decelerated to indicate a "spin". The primary rotating portion 210 is stopped by the deceleration. When the primary rotating portion 210 is stopped, a value is positioned below the pointer indicator 250. As the primary rotating portion 210 is rotated to indicate a spin, the secondary rotating portion 220 is rotated at different angular velocities with respect to the primary rotating portion 210. The respective motions of the first or primary rotating portion 210 and the secondary rotating portion 220 can be accomplished with separate drivers or drive motors. In the example embodiment shown in FIG. 2, the respective motions of the first or primary rotating portion 210 and the secondary rotating portion 220 are accomplished mechanically. In other words, the drive mechanism for the primary rotating portion 210 can be used to also drive the secondary or second rotating portion 220.

Figure 3:
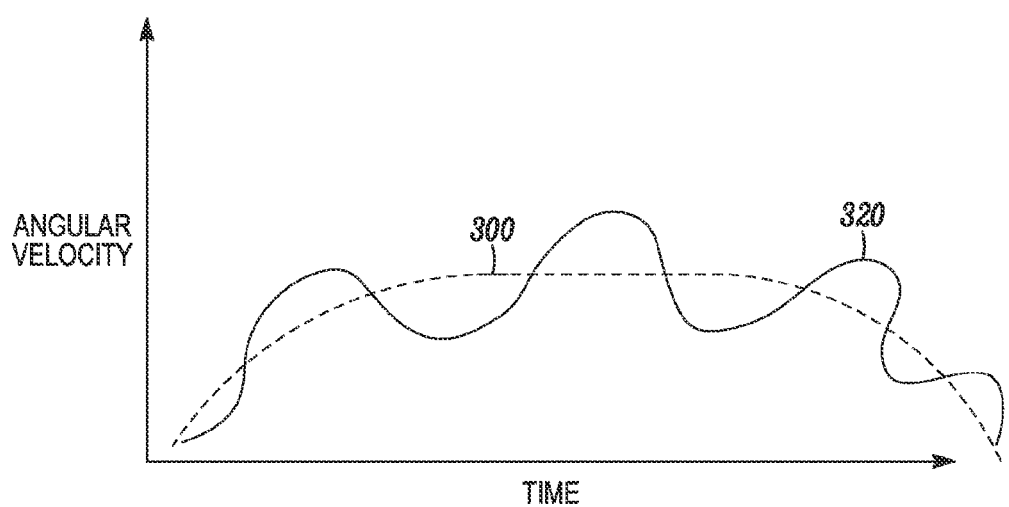
FIG. 3 is a graph showing the angular velocity of the primary rotating portion of a display and showing the angular velocity of the secondary rotating portion of a display of an electronic gaming machine, according to an example embodiment.

FIG. 3 is a graph showing the angular velocity of the primary rotating portion 210 of a display 200 and showing the angular velocity of the secondary rotating portion 220 of a display 200 through the course of a spin on the electronic gaming machine 100, according to an example embodiment. The angular velocity of the primary rotating portion 210 is shown by the dotted line 300. As shown by the dotted line 300 the primary rotating portion 210 is initially accelerated and then has a substantially constant angular velocity for an amount of time and then decelerates until the angular velocity is zero. The angular velocity of the secondary rotating portion 220 is shown as solid line 320. As is shown in the graph, the angular velocity of the secondary rotating portion 220 varies with respect to the angular velocity of the first rotating portion 210. In other words, through the course of a spin, the angular velocity of the secondary rotating portion 220 is generally different than the angular velocity of the first rotating portion 210. At sometimes it is slower and other times it is greater than the angular velocity of the first rotating portion 210. Of course, when rotation starts and when rotation ends both the first rotating portion and the second rotating portion are also at zero velocity. In some embodiments, one of the first and second rotating portion may be stopped while the other of the first and second rotating portions may continue to spin until it to stops. In other words, the first rotating portion 210 and the second rotating portion 2202 not have to stop at substantially the same time. One of the first rotating portion 210 or the second rotating portion 220 can lag the other in terms of starting or stopping their respective rotation.

Figure 4:
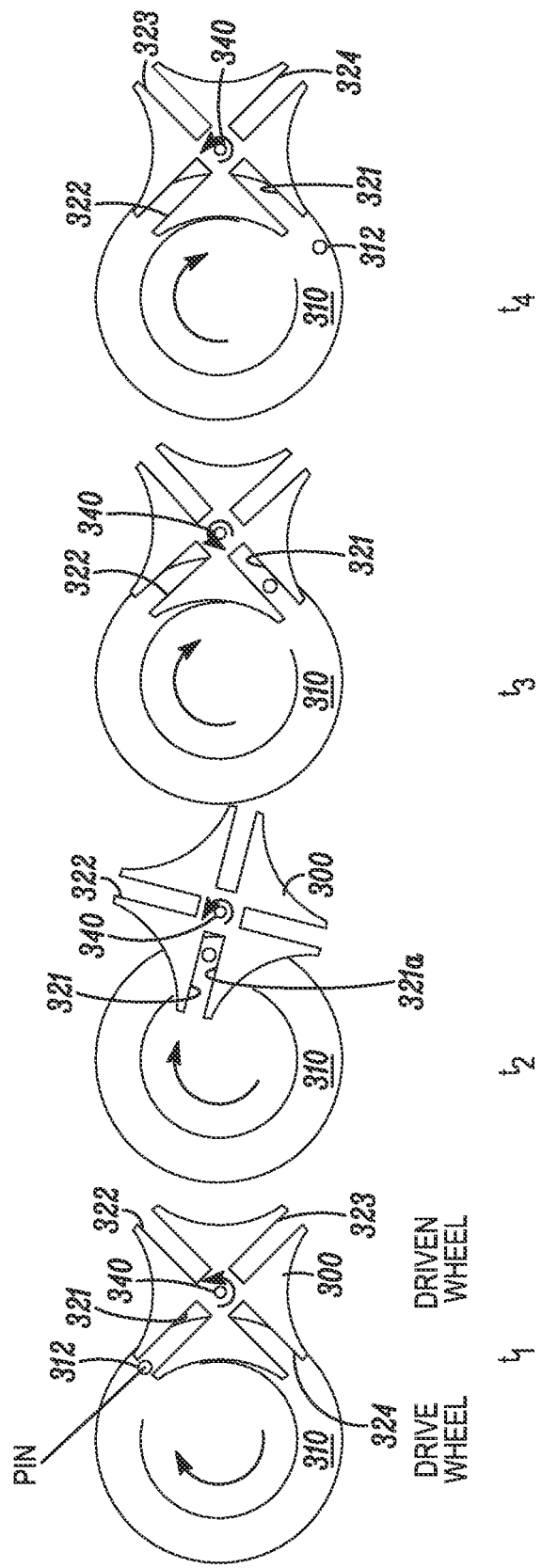
FIG. 4 is a view of a single Geneva wheel driven by a drive wheel, according to an example embodiment.

FIG. 4 is a view of a single Geneva wheel 300 driven by a drive wheel 310, over time, according to an example embodiment. The motion of the first rotating portion 210 and the second rotating portion 220 can be achieved mechanically by using one or more Geneva wheels 300 driven by a drive wheel 310. FIG. 4 shows a drive wheel 310 that includes a drive pin 312 driving a single Geneva wheel 300. The motion of a single Geneva wheel driven by the drive wheel is first described here. The motion of several or a plurality of Geneva wheels 300 being driven by a drive wheel 310 will be discussed with respect to FIG. 6. A single Geneva wheel 300 is first described with respect to FIG. 4 for the sake of simplicity. The drive pin 312 is positioned near the outer edge of the drive wheel 310. A single Geneva wheel 300 is shown in various positions as it is driven by the drive pin 312 at times $t_1, \ldots t_4$. The Geneva wheel 300 includes a plurality of elongated slits 321, 322, 323, 324. The plurality of elongated slits 321, 322, 323, 324 are along radials from the center of the Geneva wheel 300. In this example embodiment the elongated slits 321, 322, 323, 324 are substantially perpendicular to one another. The Geneva wheel 300 is rotates about a central axis 340. The Geneva wheel 300 can be attached to a secondary rotating portion 220 while the first rotating portion 210 is driven by the drive wheel 310. The Geneva wheel 300 is rotatably mounted so that the slit 321 can be positioned to be substantially tangent to the circular path associated with the drive pin 312. As shown at time $t_1$, the drive pin 312 winters the slit 321. The pin 312 enters the slit 321 and the pin 312 proceeds down a portion of the length of the slit 321. The pin 312 progresses along its circular path and drives against one edge of the slit 321 and moves or rotates the Geneva wheel 300 in a counterclockwise direction as depicted by the arrow about the axis 340 of the Geneva wheel. At time $t_2$, the drive pin 312 has progressed down substantially the length of the slit 321 and the drive pin 312 is placing a force on sidewall 321a of the slit 321. At time $t_3$, the drive pin 321 continues to drive against the side wall 321a until the slit 321 is again parallel with another tangential line to the circular path of the drive pin 312. At time $t_4$, the drive pin 312 has exited the slit 321 and the slit 321 is positioned along a line tangential to the circular path of the drive pin 312. At this point, the drive pin 312 and the drive wheel 310 have passed through approximately 100° of rotation. The rotation has been in a clockwise direction. The Geneva wheel 300 has been driven substantially 90°. Initially the slit 321 was positioned along a tangential line to the path of the drive pin 312. After the Geneva wheel is driven 90°, the next slit 322 on the Geneva wheel 300 is now positioned on the same or substantially the same tangential line and is ready to receive the drive pin 312. This process repeats with every rotation of the drive wheel 310. The drive pin 312 drives the Geneva wheel 300 via successive slits 321 322, 323, 324. The drive wheels 310 can move out a substantially angular velocity and produce a varied angular velocity rotational output to a body connected to the Geneva wheel 300. For example, as the drive pin and initially enters the slit 321 the Geneva wheel is substantially still. As the drive pin 312 passes down the slit 321, the drive pin eventually acts upon the sidewall 321a and begins the rotation of the Geneva wheel 300. As the force on the sidewall 321a becomes larger the rotational velocity of the Geneva wheel increases until maximum velocity is reached at approximately the time that the slit 321 is on a radial line from the center axis of the drive wheel 310. Further rotation causes the drive pin to continue placing a force on the sidewall 321 until the slit 321 is positioned along a second tangential line to the circular path of the drive pin 312.

Figure 5:
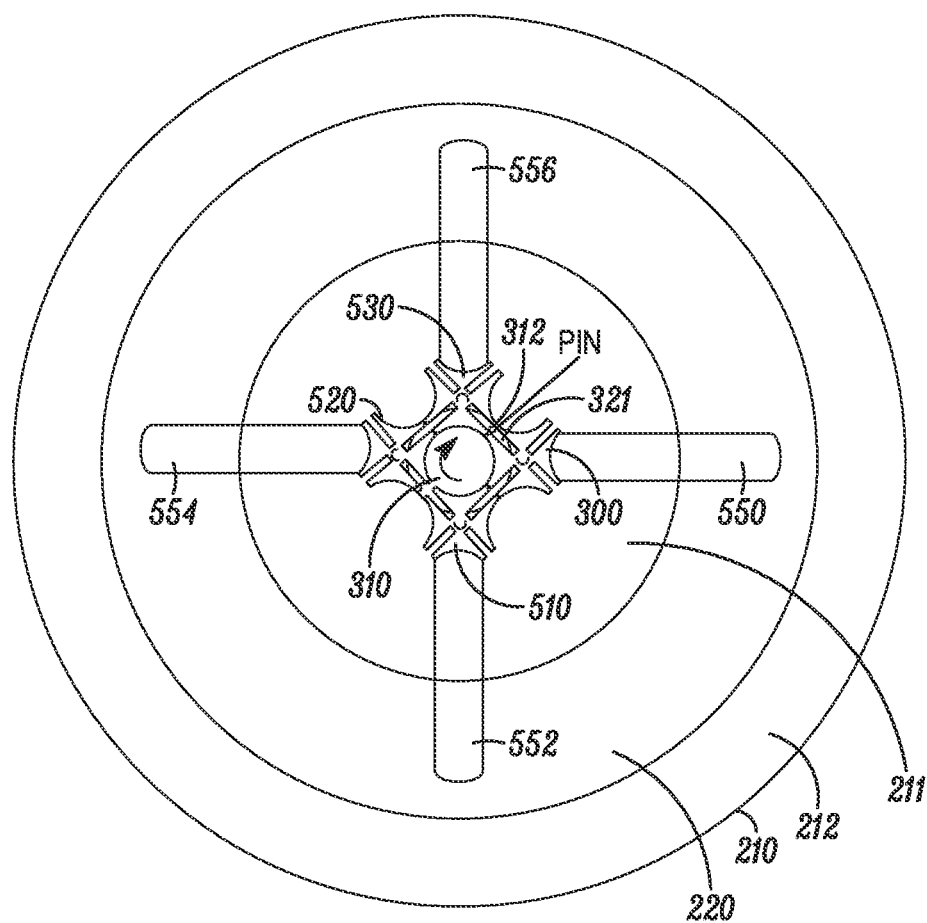
FIG. 5 is a top view of a drive motor interacting with a plurality of Geneva wheels, as part of a display for an electronic gaming machine, according to an example embodiment.

FIG. 5 is a top view of a drive motor 310 interacting with a plurality of Geneva wheels, 300, 510, 520, and 530, as part of a display 200 for an electronic gaming machine, according to an example embodiment. FIG. 5 is a view of the display 200 from the backside of the display as shown in FIG. 2. Actually only the rotating portions of the display are shown. The display includes a primary rotating portion 210 which has an inner wheel 211 and an outer wheel 212. The display 200 also includes a secondary rotating portion 220. The inner wheel 211 and the outer wheel 212 rotated substantially the same angular velocity. The drive wheel 310 is connected to the inner wheel 211 of the primary rotating portion 210. The drive wheel 310 includes drive pin 312. As the drive wheel 310 rotates and drives the primary rotating portion 210, the drive pin 312 interacts with and drives the Geneva wheels 300, 510, 520, and 530. The pin 312 initially enters a slit 321 on the Geneva wheel 300. The Geneva wheel 300 is attached to a connecting arm 550 which is attached at one end to the secondary rotating portion 220. The free end of the connecting arm 550 carries the Geneva wheel 300. As the pin 312 travels over its circular path it drives the Geneva wheel 300 in the same manner as described in FIG. 4. As the pin exits slot 321 (such as is shown in FIG. 4), the pin enters a slit in the Geneva wheel 510. The slit in the Geneva wheel 510 is positioned along a path tangential to the circular path of the drive pin 312. The Geneva wheel five can then moves in the same fashion or similar fashion as the Geneva wheel 300 in FIG. 4. The Geneva wheel 510 is attached to a connecting arm 552. The connecting arm 552 is attached at its other and to the secondary rotating portion 220. The connecting arm 554 is connected to the secondary rotating portion 220 and is also connected to Geneva wheel 520. As the drive pin 312 leaves the Geneva wheel 510 it enters a slit in the Geneva wheel 520. Again the same or similar motion is imparted on the Geneva wheel 520 as the Geneva wheel 310 in FIG. 4. A connecting arm 556 is also connected to the secondary rotating portion 220 and to a Geneva wheel 530. When the drive pin 312 leaves the Geneva wheel 520 and enters into a slit in Geneva wheel 530. The end result is a motion in which the secondary rotating portion 220. As can be seen, that a single drive motor or driver 310 can be used to drive both the primary rotating portion 210 and the secondary rotating portion 220. The drive wheel 310 interacts with successive Geneva wheels 300, 510, 520, and 530 as the drive pin 312 travels along this circular path. The motion imparted on the Geneva wheels 300, 510, 520, 530 is transferred to the secondary rotating portion 220 by the connecting arms 550, 552, 554 and 556. The motion that results is similar to that described above and shown in the graph of FIG. 3.

Figure 6:
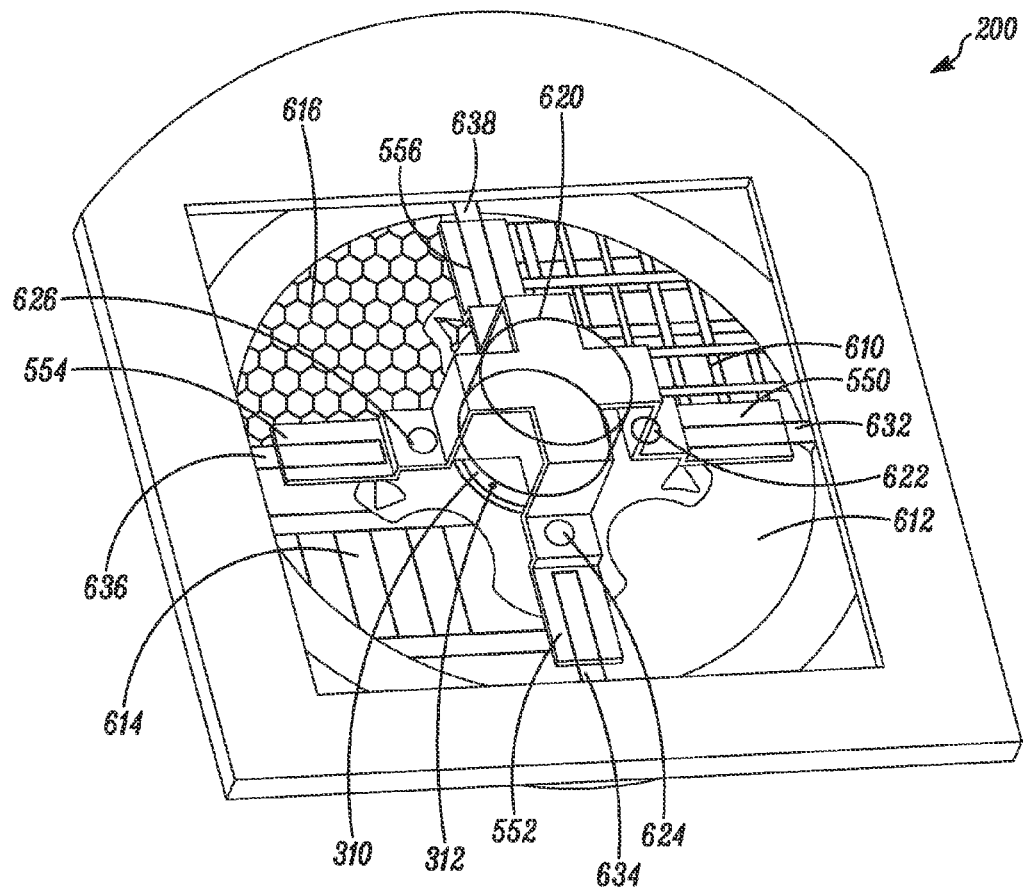
FIG. 6 is a perspective view of a backside of the display shown in FIG. 2, according to an example embodiment.

FIG. 6 is a perspective view of a backside 600 of the display shown in FIG. 2, according to an example embodiment. The backside 600 of the display 200 shows liquid crystal displays 610, 612, 614 and 616. The liquid crystal displays 610, 612, 614, 616 are arrayed around the center of the display or around the drive wheel 310. The drive wheel 310 is driven by drive motor, not shown. The drive motor may be within the drive wheel 310, in some embodiments. The backside 600 of the display also includes a main wheel motor bracket 620. The drive wheel 310 fits within the main wheel motor bracket 620. The drive pin 312 faces the LCD displays 610, 612, 614, 616 as it travels over its circular path. Geneva wheels, such as Geneva wheel 300, are attached or affixed so that they can engage the drive pin 312 and in part the motion previously discussed to the secondary rotating portion 220 (shown in FIG. 2). The Geneva wheels are not shown in FIG. 6. The main wheel motor bracket 620 also includes several fixed shaft bearings, such as bearings 622, 624, 626. The Geneva wheels, such as Geneva wheels 300, 510, 520, 530 are connected to the fixed shaft bearings 622, 624, 626 and one not shown. The backside also includes several light emitting diode boards 632, 634, 636, 638. The light emitting diode boards 632, 634, 636, 638 provide a light between the sections of the secondary rotating portion 220 (shown in FIG. 2). Also shown on the backside 600 are the connecting arms 550, 552, 554, 556. As shown and discussed above, one drive wheel 310 having a drive pin 312 can impart the rotary motion discussed above on the first rotating portion 210 and on the second rotating portion 220. It should also be noted that the first rotating portion 210 can be driven separately from the second rotating portion 220 using two drive motors. To achieve the motion described above, the drive motor for driving the second rotating portion 220 would have to be programmed to produce a variable velocity with respect to the angular velocity of the first rotating portion 210.

This concept combines several different aspects of our wheel products with some new effects. By combining a Geneva wheel mechanical watch drive mechanism with spinning wheel type devices new effects can be achieved with very low cost. Implementing LCD backgrounds into the device matches up a mechanical with newer display technology. One advantage at the Geneva wheel mechanism is that only one source of energy is needed to drive several rotating items, such as the first rotating portion 210 and the second rotating portion 220. In one example embodiment, this type of mechanism to produce rotating effects and combinations of pointers. The Geneva drive is a center drive gear mechanism that translates a continuous rotation into an intermittent rotary motion. As discussed above, the rotating drive wheel has a pin that reaches into a slot of the driven wheel advancing it by one step per full rotation of the main drive. The drive wheel also has a raised circular cam blocking disk that locks the driven wheel in positions between steps. This stepper type motion can be achieved in many combinations of rotation by how many wheels are connected to the main drive and how many drive slots are used in the driven wheel.

In this example for every full rotation of the main wheel four secondary wheels rotate as well. The secondary wheel could be used for effects, as pointers for game awards, or bonus triggers. Since the wheels are clocked to the main drive their locations are game predictable depending on the revolutions per minute of the main wheel. This allows the pointer wheels to line up with any graphical display content on the LCD background.

The combinations of driven wheels to drive shaft can be varied to achieve different results. If the final design is carefully planned the design could be easily retrofitted from a two wheel system to a four wheel system etc. All this would take would be the creation of wheel kits featuring the different combinations, a new drive cam, and new game software. This provides a future set of paths for visual electronic gaming machine upgrades. With such a future set of paths, an electronic gaming machine can be upgraded well into the future so that the games are continually renewed or refreshed to keep a high level of interest in particular games amongst various players.

Figure 7:
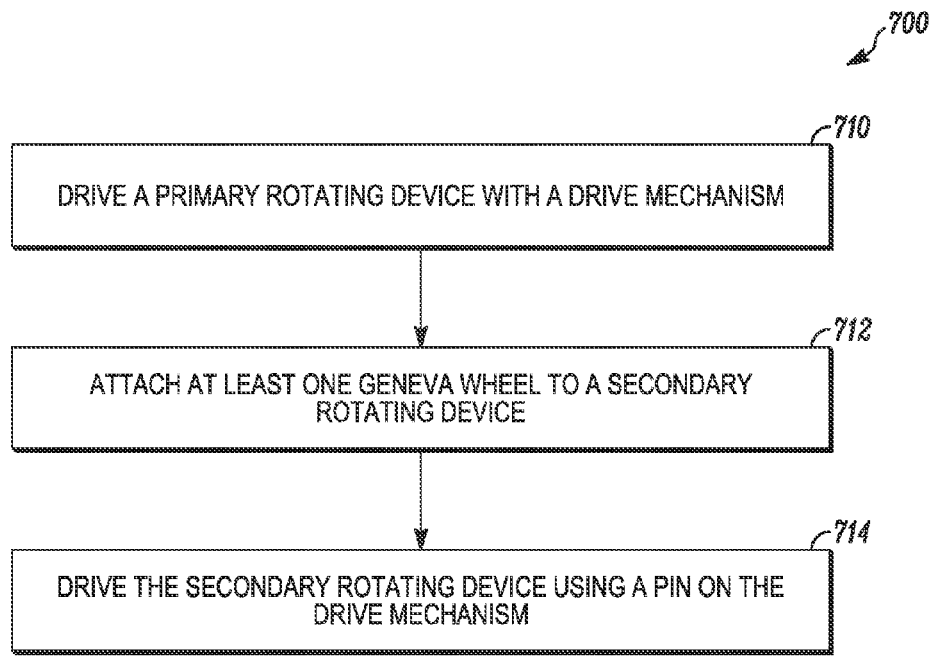
FIG. 7 is a flow diagram of a method for moving a first rotating portion with respect to a second rotating portion of a display of an electronic gaming machine, according to an example embodiment.

FIG. 7 is a flow diagram of a method 700 for moving a first rotating portion with respect to a second rotating portion of a display of an electronic gaming machine, according to an example embodiment. The method 700 for display of a game includes driving a primary rotating device with a drive mechanism 710, attaching at least one Geneva wheel to a secondary rotating device 712, and driving the secondary rotating device using a pin on the drive mechanism 714. The pin on the drive mechanism is positioned to engage the at least one Geneva wheel on the secondary rotating device. In some embodiments, a plurality of Geneva wheels are attached to the secondary rotating device. The plurality of Geneva wheels are driven with the pin on the drive mechanism. The secondary rotating device includes at least one window. A secondary display is placed in a position for viewing through the window of the secondary rotating device. Driving the primary rotating device includes rotating the primary rotating device at a first angular velocity and driving the secondary rotating device includes rotating the secondary device at an angular velocity which differs from the first angular velocity during portions of the rotation.

Figure 8:
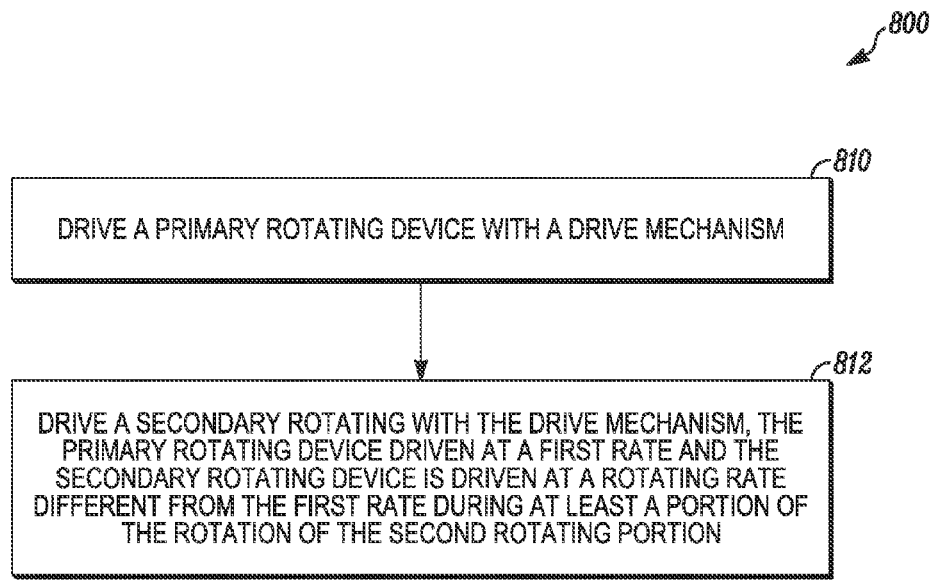
FIG. 8 is a flow diagram of another method for moving a first rotating portion with respect to a second rotating portion of a display of an electronic gaming machine, according to an example embodiment.

FIG. 8 is a flow diagram of another method for moving a first rotating portion with respect to a second rotating portion of a display of an electronic gaming machine, according to an example embodiment. The method 800 for displaying a game includes driving a primary rotating device with a drive mechanism 810, and driving a secondary rotating with the drive mechanism 812. The primary rotating device is driven 810 at a first rate and the secondary rotating device is driven 812 at a rotating rate different from the first rate during at least a portion of the rotation. The secondary rotating device includes at least one window. The primary rotating device includes an inner wheel and an outer wheel. The secondary rotating device includes a ring positioned between the inner wheel and the outer wheel.

A gaming display includes a primary rotating portion and a secondary rotating portion. A drive mechanism for driving the primary rotating portion includes a pin. A Geneva wheel mechanism is attached to the secondary rotating portion. The pin of the rotary drive mechanism engages a slot in the Geneva wheel mechanism to drive the secondary rotating portion at a different angular velocity than the primary rotating portion. The gaming display apparatus includes a secondary display situated behind at least one of the first rotating portion and the second rotating portion, at least one of the first rotating portion and the second rotating portion having a window therein for viewing at least a portion of the secondary display. In one embodiment, the secondary rotating portion includes a plurality of Geneva wheels attached to the secondary rotating portion. The plurality of Geneva wheels are positioned to engage the pin on the driving mechanism. The plurality of Geneva wheels are attached at a substantially equal distance from the center of the second rotating portion at different circumferential positions on the second rotating portion. The gaming display apparatus also includes at least one liquid crystal display positioned to be viewed through at least a portion of the secondary rotating device. The primary rotating portion includes an inner wheel and an outer wheel that are separated. The inner wheel rotates at substantially the same angular velocity as the outer wheel. The inner wheel and the outer wheel are attached to one another. The inner wheel and the outer wheel rotating at substantially the same angular velocity, while the second rotating portion rotates at different angular velocities when compared to the inner wheel and outer wheel.

A gaming display apparatus includes a primary rotating device and a secondary rotating device. The gaming display apparatus also includes a rotary drive mechanism attached to the primary rotating device. A Geneva wheel mechanism is attached to the secondary rotating device. The rotary drive mechanism includes a pin for engaging the Geneva wheel mechanism. The pin and the Geneva wheel mechanism drive the secondary rotating device. The secondary rotating device includes a transparent portion. A secondary display is positioned behind the primary and secondary rotating portions and is viewable through the transparent portion. In one embodiment, the secondary display is at least one liquid crystal display positioned to be viewed through at least a portion of the secondary rotating device. In one embodiment, the secondary rotating device includes a plurality of Geneva wheels attached to the secondary rotating device. The pin of the rotary drive mechanism drives the plurality of Geneva wheels attached to the secondary rotating device. The primary rotating device includes an inner wheel and an outer wheel. In an embodiment, the inner wheel and the outer wheel are separated. The inner wheel and the outer wheel can also be attached to one another so that the inner wheel and the outer wheel rotate at substantially the same angular velocity. The secondary rotating portion, in some embodiments, is a ring positioned between the inner wheel and the outer wheel of the primary rotating device. The gaming display can also include a chase light positioned around the primary rotating device. The rotary drive mechanism includes a stepper motor.

Figure 9:
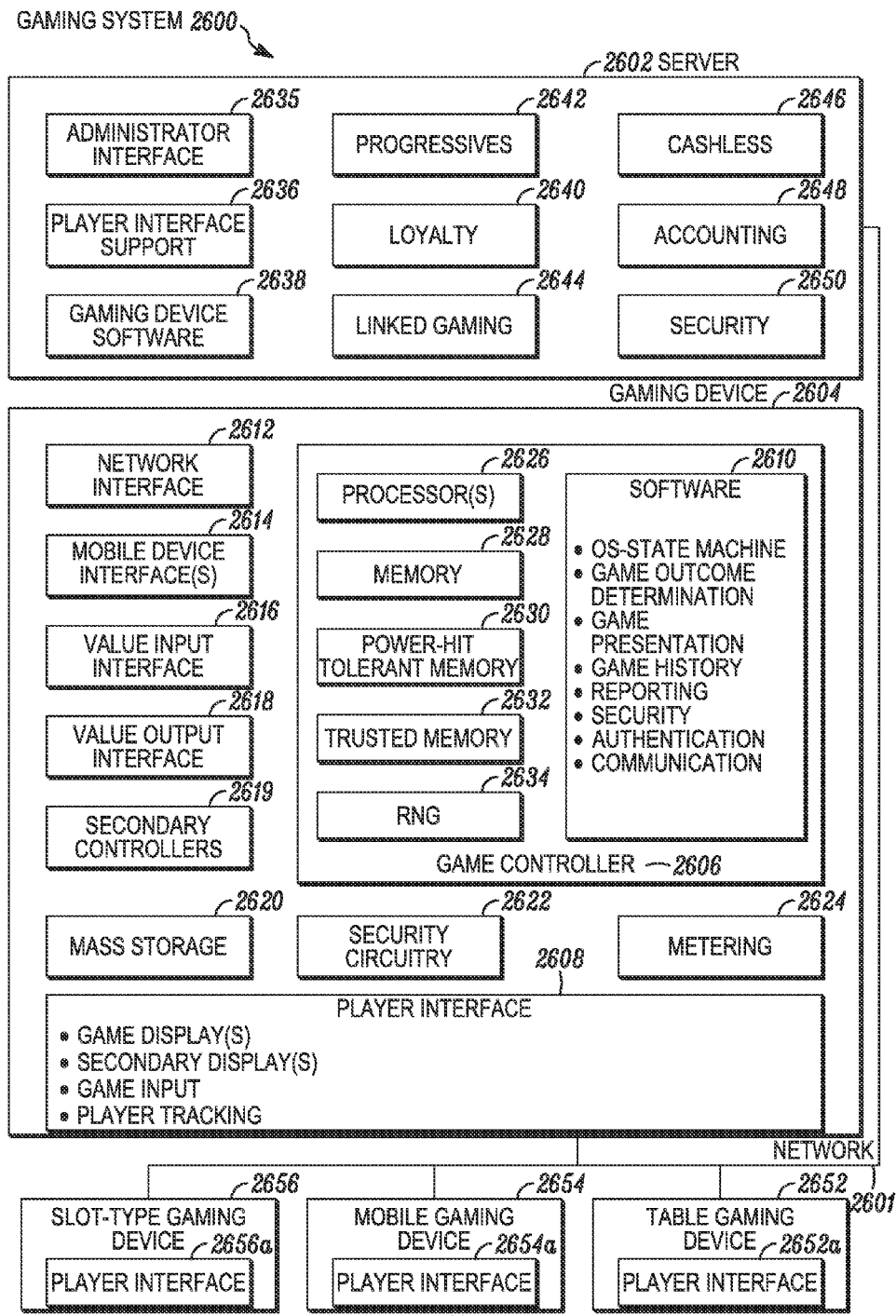
FIG. 9 is a schematic block diagram of a gaming system, according to an example embodiment.

FIG. 9 is a schematic block diagram of a gaming system 2600, according to an example embodiment. FIG. 9 shows a block diagram of a gaming system 2600 in accordance with the described embodiments. The gaming system 2600 can include one or more servers, such as server 2602, and a variety of gaming devices including but not limited to table gaming devices, such as 2652, mobile gaming devices, such as 2654, and slot-type gaming devices, such as 2656. The table gaming devices, such as 2652, can include apparatus associated with table games where a live operator or a virtual operator is employed. The gaming devices and one or more servers can communicate with one another via a network 2601. The network can include wired, wireless or a combination of wired and wireless communication connections and associated communication routers.

Some gaming devices, such as 2652, 2654 and 2656, can be configured with a player interface that allows at least 1)

selections, such as a wager amount, associated with a wager-based game to be made and 2) an outcome of the wager-based game to be displayed. As an example, gaming devices, 2652, 2654 and 2656, include player interfaces, 2652a, 2654a and 2656a, respectively. Typically, gaming devices with a player interface are located in publically accessible areas, such as a casino floor. On the other hand, some gaming devices, such as server 2602, can be located in publically inaccessible areas, such is in a back-room of a casino or even off-site from the casino. Gaming devices located in publically inaccessible areas may not include a player interface. For instance, server 2602 does not include a player interface. However, server 2602 includes an administrator interface 2635 that allows functions associated with the server 2602 to be adjusted.

An example configuration of a gaming device is described with respect to gaming device 2604. The gaming device 2604 can include 1) a game controller 2606 for controlling a wager-based game played on the gaming device and 2) a player interface 2608 for receiving inputs associated with the wager-based game and for displaying an outcome to the wager-based game. In more detail, the game controller 2606 can include a) one or more processors, such as 2626, b) memory for holding software executed by the one or more processors, such as 2628, c) a power-hit tolerant memory, such as 2630, d) one or more trusted memories, such as 2632, e) a random number generator and f) a plurality of software applications, 2610. The other gaming devices, including table gaming device 2652, mobile gaming device 2654, slot-type gaming device 2656 and server 2602, can each include a game controller with all or a portion of the components described with respect to game controller 2606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 2630 can be used as a persistent memory for critical data, such as critical data associated with maintaining a "state" machine on the gaming device. One characteristic of a power-hit tolerant memory 2630 is a fast data transfer time. Thus, in the event of a power-failure, which might be indicated by a sudden power fluctuation, the critical data can be quickly loaded from volatile memory, such as RAM associated with the processor 2626, into the power-hit tolerant memory 2630 and saved.

In one embodiment, the gaming device 2605 can be configured to detect power fluctuations and in response, trigger a transfer of critical data from RAM to the power-hit tolerant memory 2630. One example of a power-hit tolerant memory 2630 is a battery-backed RAM. The battery supplies power to the normally volatile RAM so that in the event of a power failure data is not lost. Thus, a battery-backed RAM is also often referred to as a nonvolatile RAM or NV-RAM. An advantage of a battery-backed RAM is that the fast data transfer times associated with a volatile RAM can be obtained.

The trusted memory 2632 is typically a read-only memory of some type that may be designed to be unalterable. An EPROM or EEPROM are two types of memory that can be used as a trusted memory 2632. The gaming device 2604 can include one or more trusted memories.

Prior to installation the contents of a trusted memory, such as 2632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 2604. In one embodiment, the error condition can result in the gaming device entering a tilt state where game play is temporarily disabled on the gaming device.

Sometimes verification of software executed on the gaming device 2604 can be performed by a regulatory body, such as a government agency. Often software used by a game controller, such as 2606, can be highly regulated, where only software approved by a regulatory body is allowed to be executed by the game controller 2606. In one embodiment, the trusted memory 2632 can store authentication programs and/or authentication data for authenticating the contents of various memories on the gaming device 2604. For instance, the trusted memory 2632 can store an authentication program that can be used to verify the contents of a mass storage device, such as 2620, which can include software executed by the game controller 2606.

The random number generator (RNG) 2634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 2604, are considered critical data. Thus, generated outcomes can be stored to the power-hit tolerant memory 2630.

Not all gaming devices may be configured to generate their own game outcomes and thus, may not use an RNG for this purpose. In some embodiments, game outcomes can be generated on a remote device, such as server 2602, and then transmitted to the gaming device 2604 where the outcome and an associated award can be displayed to the player via the player interface 2608. For instance, outcomes to a slot-type game or a card game can be generated on server 2602 and transmitted to the gaming device 2604.

In other embodiments, the gaming device 2604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 2602. Next, in response to a request to play the central determination game on gaming device 2604, one of the outcomes from the pool can be downloaded to the gaming device 2604. A game presentation including the downloaded outcome can be displayed on the gaming device 2604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 2654 to server 2602. After receiving the game outcome from the remote device, a game presentation for the game outcomes generated remotely can be generated and displayed on the mobile device. In some instances, the game presentation can also be generated remotely and then streamed for display to the mobile device.

The game controller 2606 can be configured to utilize and execute many different types of software applications 2610. Typically, the software applications utilized by the game controller 2606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 2626, such as programs for implementing a state machine on the gaming device 2606. Further, the OS can be used to monitor resource utilization on the gaming device 2606. For instance, certain applications, such as applications associated with game outcome generation and game presentation that are executed by the OS can be given higher priority to resources, such as the processor 2626 and memory 2628, than other applications that can be executing simultaneously on the gaming device.

As previously described, the gaming device 2604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 2606. The peripheral devices used to generate components of the game outcome presentation can be associated with the player interface 2608 where the types of devices that are utilized for the player interface 2608 can vary from device to device.

To play a game, various inputs can be required. For instance, via input devices coupled to the gaming device 2604, a wager amount can be specified, a game can be initiated or a selection of a game choice associated with the play of the game can be made. The software 2610 executed by the game controller 2606 can be configured to interpret various signals from the input devices, such as signals received from a touch screen controller or input buttons, and affect the game played on the gaming device in accordance with the received input signals. The input devices can also be part of the player interface 2608 provided with the gaming device, such as 2604.

In other embodiments, the gaming software 2610 executed by the game controller 2606 can include applications that allow a game history including the results of a number of past games to be stored, such as the previous 10 or 100 games played on the gaming device 2604. The game history can be stored to a persistent memory including but not limited to the power-hit tolerant memory 2630. The gaming controller 2606 can configured to provide a menu (typically, only operator accessible), that allows the results of a past game to be displayed via the player interface 2608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 2604.

The reporting software can be used by the game controller 2606 to report events that have occurred on the gaming device 2604 to remote device, such as server 2602. For instance, in one embodiment, the game controller 2606 can be configured to report error conditions that have been detected on the gaming device 2604, such as if a device has malfunctioned or needs attention. For instance, the reporting software can be used to send a message from the gaming device 2604 to the server 2602 indicating that a printer on the gaming device needs a refill of tickets. In another embodiment, the gaming controller 2606 can be configured to report security events that may have occurred on the gaming device 2604, such as but not limited to if a door is opened, a latch is activated or an interior portion of the gaming device 2604 has been accessed.

In yet other embodiments, the game controller 2606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 2604. As part of a loyalty program, the gaming activity can be associated with a particular player. The reporting software can include player tracking elements that allow the gaming activity of a particular player to be reported to a remote device, such as server 2602.

The game controller 2606 can execute the authentication software to verify the authenticity of data and/or software programs executed on the gaming device 2604. For instance, the authentication software can be used to verify the authenticity of data and/or software applications when they are first downloaded to the gaming device 2604. Further, the authentication software can be used to periodically verify the authenticity of data and/or software applications currently residing on the gaming device, such as software applications stored on one of the memories coupled to the gaming device 2604 including applications loaded into the memory 2628 for execution by the processor 2626.

The communication software executed by the game controller 2606 can be used to communicate with a variety of devices remote to the gaming device 2604. For instance, the communication software can be used to communicate with one or more of a) servers remote to the device, such as 2602, b) other gaming devices, such as table gaming device 2652, mobile gaming device 2654 and slot-type gaming device 2656 and c) mobile devices carried by casino personnel or players in the vicinity of the gaming device 2604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 2604 can communicate with one or more remote devices via one or more network interfaces, such as 2612. For instance, via network interfaces 2612 and the network 2601, the gaming device 2604 can communicate with other gaming devices, such as server 2602 and/or gaming devices, 2652, 2654 and 2656. The network interfaces can provide wired or wireless communications pathways for the gaming device 2604. Some gaming devices may not include a network interface or can be configured to operate in a stand-alone mode where the network interface is not connected to a network.

In other embodiments, a mobile device interface or interfaces, such as 2614, can be provided for communicating with a mobile device, such as a cell phone or a tablet computer carried by players or casino personnel temporarily in the vicinity of the gaming device 2604. A wireless communication protocol, such as Bluetooth™ and a Wi-Fi compatible standard, can be used for communicating with the mobile devices via the mobile device interfaces 2614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 2604. The wired communication interface can be configured to provide communications between the gaming device 2604 and the mobile device and/or providing power to the mobile device.

The gaming device 2604 can include one or more each of value input devices 2616 and value output device 2618. The value input devices 2616 can be used to deposit cash or indicia of credit onto the gaming device. The cash or indicia of credit can be used to make wagers on games played on the gaming device 2604. Examples of value input devices 2616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 2604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 2616 and value output devices 2618 can vary from device to device. In some embodiments, a gaming device 2604 may not include a value input device or a value output device. For instance, a thin-client gaming device used in a mobile gaming application may not include a value input device and a value output device. Instead, a remote account can be used to maintain the credits won or lost from playing wagerbased games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 2604 can include one or more secondary controllers 2619. The secondary controllers can be associated with various peripheral devices coupled to the gaming device, such as the value input devices and value output devices described in the preceding paragraphs. As another example, the secondary controllers can be associated with peripheral devices associated with the player interface 2608, such as input devices, video displays, electro-mechanical displays and a player tracking unit. In some embodiments, the secondary controllers can receives instructions and/or data from and provide responses to the game controller 2606. The secondary controller can be configured to interpret the instructions and/or data from the game controller 2606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 2606 characterizing the touch input.

In a particular embodiment, a secondary controller can be used to control a number of peripheral devices independently of the game controller 2606. For instance, a player tracking unit can include one or more of a video display, a touch screen, card reader, network interface or input buttons. A player tracking controller can control these devices to provide player tracking services and bonusing on the gaming device 2604. In alternate embodiments, the game controller 2604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 2606, which does control the wager-based game. In general, using a secondary controller, certain functions of the gaming device 2604 that are not subject to as much regulatory scrutiny as the game play functions can be decoupled from the game controller 2606 and implemented on the secondary controller instead. An advantage of this approach, like for the player tracking controller, is that software approval process for the software executed by the secondary controller can be less intensive than the process needed to get software approved for the game controller.

A mass storage unites) 2620, such as a device including a hard drive, optical disk drive, flash memory or some other memory storage technology can be used to store applications and data used and/or generated by the gaming device 2604. For instance, a mass storage unit, such as 2620, can be used to store gaming applications executed by the game controller 2606 where the gaming device 2604 can be configured to receive downloads of game applications from remote devices, such as server 2602. In one embodiment, the game controller 2606 can include its own dedicated mass storage unit. In another embodiment, critical data, such as game history data stored in the power-hit tolerant memory 2630 can be moved from the power-hit tolerant memory 2630 to the mass storage unit 2620 at periodic intervals for archival purposes and to free up space in the power-hit tolerant memory 2630.

The gaming device 2604 can include security circuitry 2622, such as security sensors and circuitry for monitoring the sensors. The security circuitry 2622 can be configured to operate while the gaming device is receiving direct power and operational to provide game players well as when the gaming device is uncoupled from direct power, such as during shipping or in the event of a power failure. The gaming device 2604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 2604, such as a mobile device has been moved to an unauthorized area. The security monitoring circuitry can be configured to generate, store and/or transmit error events when the security events, such as accessing the interior of the gaming device, have occurred. The error events may cause the game controller 2606 to place itself in a "safe" mode where no game play is allowed until the error event is cleared.

The server 2602 can be configured to provide one or more functions to gaming devices or other servers in a gaming system 2600. The server 2602 is shown performing a number of different functions. However, in various embodiments, the functions can be divided among multiple servers where each server can communicate with a different combination of gaming devices. For instance, player interface support 2636 and gaming device software 2638 can be provided on a first server, progressives can be provided on a second server, loyalty program functions 2640 and accounting 2648 can be provided on a third server, linked gaming 2644 can be provided on a fourth server, cashless functions 2646 can be provided on a fifth server and security functions 2650 can be provided on a sixth server. In this example, each server can communicate with a different combination of gaming devices because each of the functions provided by the servers may not be provided to every gaming device in the gaming system 2600. For instance, the server 2602 can be configured to provide progressive gaming functions to gaming devices 2604, 2652 and 2656 but not gaming device 2654. Thus, the server 2602 may not communicate with the mobile gaming device 2654 if progressive functions are not enabled on the mobile gaming device at a particular time.

Typically, each server can include an administrator interface that allows the functions of a server, such as 2602, to be configured and maintained. Each server 2602 can include a processor and memory. In some embodiments, the servers, such as 2602, can include a game controller with components, such as but not limited to a power-hit tolerant memory 2630, a trusted memory 2632 and an RNG 2634 described with respect to gaming device 2604. The servers can include one or more network interfaces on which wired or wireless communication protocols can be implemented. Next, some possible functions provided by the server 2602 are described. These functions are described for the purposes of illustration only and are not meant to be limiting.

The player interface support 2636 can be used to serve content to gaming devices, such as 2604, 2652, 2654 and 2656, remote to the server. The content can include video and audio content that can be output on one of the player interfaces, such as 2608, 2652*a*, 2654*a* and 2656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 2636 can be affected by inputs made on the gaming device. For instance, the service window can be generated on a touch screen display where inputs received via the service window can be sent back to server 2602. In response, to the received inputs, the server 2602 can adjust the content that is displayed on the remote gaming device that generated the inputs.

If a player's identity is known, then the player interface support 2636 can be used to provide custom content to a remote gaming device, such as 2604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 2640. The custom content can include notifications, advertising and specific offers that are determined to be likely of interest to a particular player.

The gaming device software function 2638 can be used to provide downloads of software for the game controller and/or second controllers associated with peripheral devices on a gaming device. For instance, the gaming device software 2638 may allow an operator and/or a player to select a new game for play on a gaming device. In response to the game selection, the gaming device software function 2638 can be used to download game software that allows a game controller to generate the selected game. In another example, in response to determining that a new counterfeit bill is being accepted by bill acceptors in the gaming system 2600, the gaming device software function 2638 can be used to download a new detection algorithm to the bill acceptors that allow the counterfeit bill to be detected.

The progressive gaming function 2642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 2642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 2640 can be used to implement a loyalty program within a casino enterprise. The loyalty function 2640 can be used to receive information regarding activities within a casino enterprise including gaming and nongaming activities and associate the activities with particular individuals. The particular individuals can be known or may be anonymous. The loyalty function 2640 can used to store a record of the activities associated with the particular individuals as well as preferences of the individuals if known. Based upon the information stored with the loyalty function 2640 comps (e.g., free or discounted services including game play), promotions and custom contents can be served to the particular individuals.

The linked gaming function 2644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 2646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 2600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 2650 can be used to combat fraud and crime in a casino enterprise. The security function 2650 can be configured to receive notification of a security event that has occurred on a gaming device, such as an attempt at illegal access. Further, the security function 2650 can receive transactional data that can be used to identify if gaming devices are being utilized in a fraudulent or unauthorized manner. The security function 2650 can be configured to receive, store and analyze data from multiple sources including detection apparatus located on a gaming device and detection apparatus, such as cameras, distributed throughout a casino. In response to detecting a security event, the security function 2650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 2604 is described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed:

1. A gaming display apparatus comprising:
   a primary rotating display device;
   a rotary drive mechanism attached to the primary rotating device;
   a secondary rotating display device;
   a Geneva wheel mechanism attached to the secondary rotating display device that includes a plurality of Geneva wheels, the rotary drive mechanism including a pin for engaging the plurality of Geneva wheels of the Geneva wheel mechanism to drive the secondary rotating display device, the plurality of Geneva wheels being evenly distributed at circumferential positions on the second rotating display device and positioned adjacent one another, such that the pin is engaged in one of the plurality of Geneva wheels throughout the rotation of the rotary drive mechanism.

2. The gaming display apparatus of claim 1 wherein the secondary rotating display device includes a transparent portion.

3. The gaming display apparatus of claim 1 wherein the pin of the rotary drive mechanism drives the plurality of Geneva wheels attached to the secondary rotating display device.

4. The gaming display apparatus of claim 1 further comprising at least one liquid crystal display positioned to be viewed through at least a portion of the secondary rotating display device.

5. The gaming display apparatus of claim 1 wherein the primary rotating display device includes an inner wheel and an outer wheel.

6. The gaming display apparatus of claim 5 wherein the inner wheel and the outer wheel are separated.

7. The gaming display apparatus of claim 6 wherein the primary rotating display device further comprises an attachment device configured to attach the inner wheel to the outer wheel, such that the inner wheel and outer wheel rotate at substantially the same angular velocity at all times and the single rotary drive mechanism drives the inner wheel, the outer wheel, and the secondary rotating display device.

8. The gaming display apparatus of claim 7 wherein the secondary rotating display device is a ring positioned between the inner wheel and the outer wheel of the primary rotating display device.

9. The gaming display apparatus of claim 1 further comprising a chase light positioned around the primary rotating display device.

10. The gaming display apparatus of claim 1 wherein the rotary drive mechanism includes a stepper motor.

11. A method for display of a game that includes a fixed portion, a primary rotating display device, and a secondary rotating display device, the method comprising:
driving the primary rotating display device with a drive mechanism;
and
driving the secondary rotating display device using a pin attached to the drive mechanism, the pin on the drive mechanism positioned to engage a plurality of Geneva wheels on the secondary rotating display device to impart a motion wherein the angular velocity of the secondary rotating display device is greater than the rotation of the primary rotating display device for a portion of the rotation and is lesser than the angular velocity of the primary rotating display device during another portion of the rotation;
wherein the plurality of Geneva wheels are positioned at even circumferential positions around the second rotating display device such that the plurality of Geneva wheels are adjacent to one another and are configured to engage the pin attached to the drive mechanism throughout rotation of the drive mechanism.

12. The method of claim 11 wherein the secondary rotating display device includes at least one window.

13. The method of claim 12 further comprising positioning a secondary display in a position for viewing through the window of the secondary rotating display device.

14. A gaming display comprising;
a primary rotating portion;
a drive mechanism for driving the primary rotating portion, the drive mechanism including a pin;
a secondary rotating portion;
a Geneva wheel mechanism including a plurality of Geneva wheels attached to the secondary rotating portion, the pin of the rotary drive mechanism engaging the plurality of Geneva wheels of the Geneva wheel mechanism to drive the secondary rotating portion at higher and lower angular velocities than the angular velocity than the primary rotating portion, the plurality of Geneva wheels being evenly distributed at circumferential positions on the second rotating portion and positioned adjacent to one another, such that the plurality of Geneva wheels are configured to engage the pin of the drive mechanism throughout rotation of the drive mechanism.

15. The gaming display apparatus of claim 14 including a secondary display situated behind at least one of the first rotating portion and the second rotating portion, at least one of the first rotating portion and the second rotating portion having a window therein for viewing at least a portion of the secondary display.

16. The gaming display apparatus of claim 14 wherein the plurality of Geneva wheels are attached at a substantially equal distance from the center of the second rotating portion at different circumferential positions on the second rotating portion.

17. The gaming display apparatus of claim 14 further comprising at least one liquid crystal display positioned to be viewed through at least a portion of the secondary rotating device.

18. The gaming display apparatus of claim 14 wherein the primary rotating portion includes an inner wheel and an outer wheel.

19. The gaming display apparatus of claim 18 wherein the inner wheel and the outer wheel are separated.

20. The gaming display apparatus of claim 19 wherein the primary rotating display device further comprises an attachment device configured to attach the inner wheel to the outer wheel, such that the the inner wheel rotates at substantially the same angular velocity as the outer wheel at all times and the single drive mechanism drives the inner wheel, the outer wheel, and the secondary rotating portion.

21. The gaming display apparatus of claim 20 wherein the second rotating portion rotates at different angular velocities when compared to the inner wheel and outer wheel.

22. The gaming display apparatus of claim 14 wherein the rotary drive mechanism includes a stepper motor.

23. The method of claim 11 wherein the primary rotating display device comprises an inner wheel and an outer wheel that are separated from one another, wherein the method further comprises attaching the inner wheel to the outer wheel in a manner such that the inner wheel and outer wheel rotate at substantially the same angular velocity at all times, wherein the single drive mechanism is configured to drive the inner wheel, the outer wheel, and the secondary rotating display device.

* * * * *

UNITED STATES PATENT AND TRADEMARK OFFICE
CERTIFICATE OF CORRECTION

PATENT NO. : 8,974,280 B2  
APPLICATION NO. : 13/402493  
DATED : March 10, 2015  
INVENTOR(S) : Kehl LeSourd Page 1 of 1

It is certified that error appears in the above-identified patent and that said Letters Patent is hereby corrected as shown below:

IN THE CLAIMS

In Claim 1, Column 20, Line 25, after "rotating" insert --display--.
In Claim 1, Column 20, Line 27, after ";" insert --and--.
In Claim 1, Column 20, Line 35, replace "second" with --secondary--.
In Claim 11, Column 21, Line 13, replace the first instance of "the" with --an--.
In Claim 11, Column 21, Line 14, delete "the".
In Claim 11, Column 21, Line 16, replace the second instance of "the" with --an--.
In Claim 11, Column 21, Line 20, replace "second" with --secondary--.
In Claim 14, Column 21, Line 30, between "display" and "comprising" insert --apparatus--.
In Claim 14, Column 21, Line 34, after ";" insert --and--.
In Claim 14, Column 21, Line 37, delete "rotary".
In Claim 14, Column 21, Line 40, replace "the" with --an--.
In Claim 14, Column 21, Line 41, replace "than" with --of--.
In Claim 14, Column 21, Line 43, replace "second" with --secondary--.
In Claim 15, Column 22, Line 5, replace "first" with --primary--.
In Claim 15, Column 22, Line 6, replace "second" with --secondary--.
In Claim 15, Column 22, Line 7, replace "first" with --primary--.
In Claim 15, Column 22, Line 7, replace "second" with --secondary--.
In Claim 16, Column 22, Line 12, replace the first instance of "the" with --a--.
In Claim 16, Column 22, Line 12, replace "second" with --secondary--.
In Claim 16, Column 22, Line 13, replace "second" with --secondary--.
In Claim 17, Column 22, Line 18, replace "device" with --portion--.
In Claim 20, Column 22, Line 24, replace "display device" with --portion--.
In Claim 21, Column 22, Line 31, replace "second" with --secondary--.
In Claim 22, Column 22, Line 34, delete "rotary".

Signed and Sealed this  
First Day of March, 2016

Michelle K. Lee  
*Director of the United States Patent and Trademark Office*